(12) United States Patent
Hung et al.

(10) Patent No.: US 10,935,075 B2
(45) Date of Patent: Mar. 2, 2021

(54) LOW DUST LINEAR MODULE

(71) Applicant: HIWIN TECHNOLOGIES CORP., Taichung (TW)

(72) Inventors: Ciao-Cun Hung, Taichung (TW); Meng-Lung Tsai, Taichung (TW); Tsung-Wen Peng, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 171 days.

(21) Appl. No.: 16/166,594

(22) Filed: Oct. 22, 2018

(65) Prior Publication Data
US 2020/0124093 A1    Apr. 23, 2020

(51) Int. Cl.
*B23Q 1/58* (2006.01)
*B23Q 11/08* (2006.01)
*F16C 29/08* (2006.01)

(52) U.S. Cl.
CPC .............. *F16C 29/084* (2013.01); *B23Q 1/58* (2013.01); *B23Q 11/0825* (2013.01)

(58) Field of Classification Search
CPC ...... F16C 29/084; F16C 29/08; F16C 29/082; F16C 29/086; F16C 29/088; B23Q 1/58; B23Q 11/0825; B25J 5/02
USPC ....................................................... 74/89.32
See application file for complete search history.

(56) References Cited

FOREIGN PATENT DOCUMENTS

| CN | 101712152 A | | 5/2010 | | |
|---|---|---|---|---|---|
| JP | 2011-21745 A | | 2/2011 | | |
| JP | 2011021744 A | | 2/2011 | | |
| KR | 100775026 B1 | * | 11/2007 | | |
| KR | 10-0893943 B1 | | 5/2009 | | |
| KR | 100893943 B1 | * | 5/2009 | | |
| KR | 101321505 B1 | * | 10/2013 | | |
| KR | 101334530 B1 | * | 11/2013 | .............. | F16C 29/08 |
| TW | M319110 B1 | | 9/2007 | | |
| TW | M319110 U | * | 9/2007 | | |
| TW | I530627 B2 | | 4/2016 | | |
| TW | I611118 B | | 1/2018 | | |
| TW | I681134 B | * | 8/2018 | | |
| WO | WO-2015098122 A1 | * | 7/2015 | .............. | F16C 29/08 |

* cited by examiner

*Primary Examiner* — Jake Cook
*Assistant Examiner* — Gregory Robert Weber
(74) *Attorney, Agent, or Firm* — Wang Law Firm, Inc.

(57) ABSTRACT

A low dust linear module includes a rail unit, a slide seat unit, a dustproof strip and two magnetic members. The two magnetic members are disposed at the two slide seat end portions of the slide seat, the first magnetic attraction gap is defined between the magnetic attraction area and a corresponding one of the magnetic members, and the second magnetic attraction gap is defined between the magnetic attraction area and the slide seat cover. When the dustproof strip passes through and are magnetically attracted by the magnetic members, a gap will appear between the magnetic members and the slide seat and the slide seat cover, so that the magnetic members and the dustproof strip are kept in a gap without friction, so as to avoid the generation of dust due to friction, so that the linear module can operate normally and maintain the standard of the working environment.

12 Claims, 9 Drawing Sheets

LOW DUST LINEAR MODULE

BACKGROUND

Field of the Invention

The present invention relates to a linear module, and more particularly to a low dust linear module.

Related Prior Art

The general linear module includes a rail seat, a slide table disposed on the rail seat, and a dustproof belt disposed between the rail seat and the slide table. The dust-proof belt is used to prevent the tiny particles generated when the slide table moves from being scattered to the workplace to meet the working environment standard, and the dust-proof belt can also prevent the dust in the workplace from falling into the rail seat, thereby affecting the operation of the linear module.

Referring to FIG. 1A, which is one of the drawings of the Taiwan Patent No. 1530627, showing a slide table 111 suitable for a linear module, wherein a magnetic member 113 is mounted at both ends of a slide seat 112 of the slide table 111 for magnetically attracting a dustproof belt 114, so that the dustproof belt 114 on the slide seat 112 is convexly raised and attached to the top surface of the slide table 111, thereby achieving excellent dustproof effect, having the advantages of simple structure and easy installation.

However, since the magnetic members 113 at both ends of the slide seat 112 magnetically attract the dustproof belt 114 during the displacement of the slide table 111, and the magnetic members 113 and the dustproof belt 114 are kept in contact with each other. When the slide table 111 moves, each of the magnetic members 113 will rub against the dustproof belt 114 to generate dust, and finally the dust will fall into the slide table 111 to affect the operation of the linear module.

Referring to FIG. 1B, which is one of the drawings of the Taiwan Patent No. M319110, showing a slide table suitable for a linear module, wherein a rail 121 and a slide seat 122 are coated with a magnetic layer, and a cover 123 is disposed on the upper side of the slide seat 122. A spring piece 124 is respectively fixed on two sides of the bottom surface of the cover 123. The bottom surface of each of the spring piece 124 is coated with a Teflon layer, and a steel strip 125 is fixed on the rail 121 and sandwiched between the slide seat 122 and the cover 123, so that the steel strip 125 can completely cover the rail 121, preventing dust in the workplace from entering the inside of the rail 121, affecting the normal operation of the linear module, and preventing the tiny particles generated when the slide seat 122 moves from scattering into the workplace, so as to meet the working environment standards of the clean room.

However, the slide seat 122 is magnetically attracted to the steel strip 125 by the magnetic layer, and the two are kept in contact, and the spring piece 124 on the bottom surface of the cover 123 is abutted against the steel strip 125. Therefore, when the slide seat 122 moves, the slide seat 122 and the spring piece 124 will rub against the steel strip 125 to generate dust and tiny particles, and finally the dust will fall into the rail 121 to affect the operation of the linear module. Besides, the tiny particles will flow into the workplace and affect the working environment. Secondly, both the rail 121 and the slide seat 122 must be formed with a magnetic layer by coating or attaching, and the bottom surface of the spring piece 124 has to be formed with a Teflon layer, thereby the processing cost is high.

Referring to FIG. 1C, which is one of the drawings of the Japanese patent No. JP-A-2011-21745, showing a slide table suitable for a linear module, which is mainly provided with a magnet 132 disposed on a side cover 131 to magnetically contact both sides of a sealing strip 133 to achieve a sealing effect, and an elastic pressing member 135 is disposed in an end cover 134, so that the end cover 134 is elastically pressed against the sealing strip 133 via the elastic pressing member 135 to make the sealing effect better.

However, when the slide seat moves, the elastic pressing member 135 will rub against the sealing strip 133 to generate dust and tiny particles, and finally the dust will fall into the rail 136 to affect the operation of the linear module. Besides, the tiny particles will flow into the workplace and affect the working environment.

The present invention has arisen to mitigate and/or obviate the afore-described disadvantages.

SUMMARY

One objective of the present invention is to provide a low dust linear module capable preventing the generation of dust or fine particles due to friction, so that the linear module can operate normally and maintain the standard of the working environment.

To achieve the above objective, a low dust linear module accordance with the present invention comprises: a rail unit having a displacement direction; a slide seat assembly including a slide seat and a slide seat cover, wherein the slide seat is slidably disposed in the rail along the displacement direction, and has two slide seat end portions disposed along the displacement direction, the slide seat cover is disposed on the slide seat and includes two opposite slide-seat-cover ends arranged along the displacement direction; a dustproof strip includes: two end portions fixed to the rail unit, and a magnetic attraction section disposed between the two end portions and inserted between the slide seat and the slide seat cover; and at least one magnetic member is disposed on a side of the slide seat facing the dustproof strip, a portion of the magnetic attraction section to be magnetically attracted by the magnetic member is defined as a magnetic attraction area, a first magnetic attraction gap is defined between the magnetic attraction area and the magnetic member, and a second magnetic attraction gap is defined between the magnetic attraction area and one of the two opposite slide-seat-cover ends of the slide seat cover.

The present invention can at least achieve the following effects:

The two magnetic members are respectively disposed at the two slide seat end portions of the slide seat, the first magnetic attraction gap is defined between the magnetic attraction area and a corresponding one of the magnetic members, and the second magnetic attraction gap is defined between the magnetic attraction area and the slide seat cover. When the dustproof strip passes through and are magnetically attracted by the magnetic members, a gap will appear between the magnetic members and the slide seat and the slide seat cover, so that the magnetic members and the dustproof strip are kept in a gap without friction, so as to avoid the generation of dust or fine particles due to friction, so that the linear module can operate normally and maintain the standard of the working environment.

Preferably, the magnitudes of the first magnetic attraction gap are related to the size of the magnetic attraction area, the magnetic attraction force, and the magnetic flux density of the magnetic members, thereby being applicable to linear modules of various dimensions and ensuring that there are the first magnetic attraction gap between the magnetic attraction area and a corresponding one of the magnetic members, and a second magnetic gap between the magnetic attraction area and the slide seat cover.

Preferably, a magnetic attraction force of each of the magnetic members is between 2.3 and 5.6 kgf, a magnetic flux density Gauss is between 3900 and 4100, a magnetic surface of each of the magnetic members has a rectangular shape, a length and a width of the magnetic surface are between 10 mm×10 mm and 12 mm×12 mm, and the first magnetic attraction gap is between 0.1 and 0.8 mm, thereby ensuring that there are the first magnetic attraction gap between the magnetic attraction area and a corresponding one of the magnetic members, and the second magnetic attraction gap between the magnetic attraction area and the slide seat cover.

Preferably, a magnetic attraction force of each of the magnetic members is between 2.3 and 5.6 kgf, a magnetic flux density Gauss is between 3900 and 4100, a magnetic surface of each of the magnetic members has a circular shape, a diameter of the magnetic surface is between 10 mm and 18 mm, and a thickness of each of the magnetic members is 3 mm to 5 mm, thereby ensuring that there are the first magnetic attraction gap between the magnetic attraction area and a corresponding one of the magnetic members, and the second magnetic attraction gap between the magnetic attraction area and the slide seat cover.

Preferably, the rail unit includes a rail and two side covers, the two side covers are disposed at two sides of the rail, and each include a longitudinal portion disposed at a lateral edge of the rail and a transverse portion connected to the longitudinal portion, and a space is defined between the two transverse portions for receiving the dustproof strip.

Preferably, each of the transverse portions is provided with a support groove, and a magnetic strip is disposed in each of the support grooves, a first one of the magnetic strips magnetically attracts one side of the magnetic attraction section of the dustproof strip, and a second one of the magnetic strips magnetically attracts another side of the magnetic attraction section of the dustproof strip, so that the magnetic attraction section of the dustproof strip is sealed between the two side covers.

Preferably, the slide seat further includes an intermediate protrusion portion disposed between the two slide seat end portions, and two slide seat side walls formed on two sides of the intermediate protrusion portion, a slide seat groove is defined between the two slide seat side walls, the magnetic attraction section of the dustproof strip is inserted through the slide seat groove, and a part of the magnetic attraction section of the dustproof strip inserted in the intermediate protrusion portion protrudes upward.

Preferably, there are two said magnetic members which are respectively disposed at the two slide seat end portions of the slide seat.

Preferably, a top surface of each of the magnetic members is lower than a top surface of the transverse portion of each of the side covers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1A:
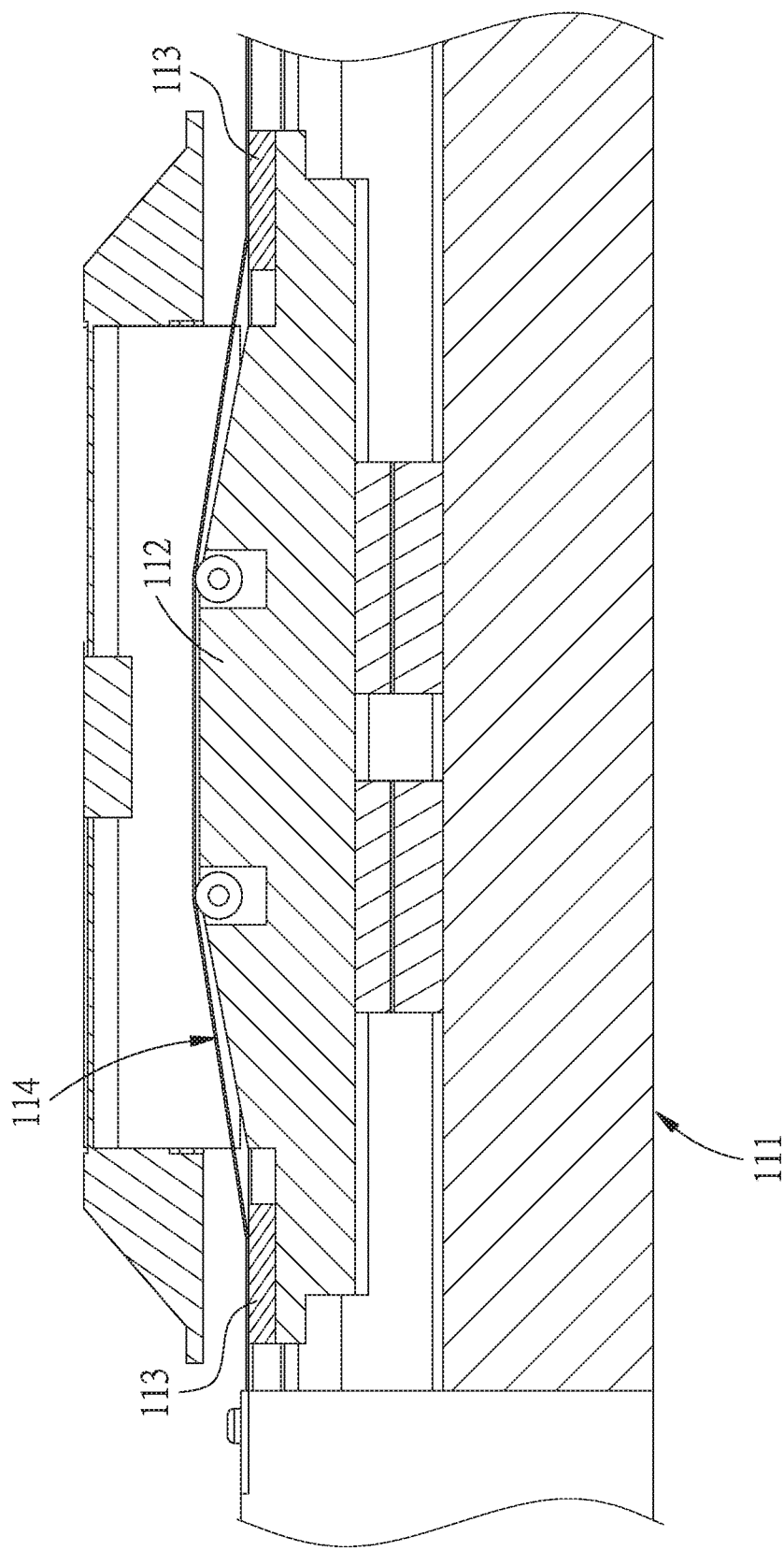
FIG. 1A is one of the drawings of the Taiwan Patent No. 1530627.
Figure 1B:
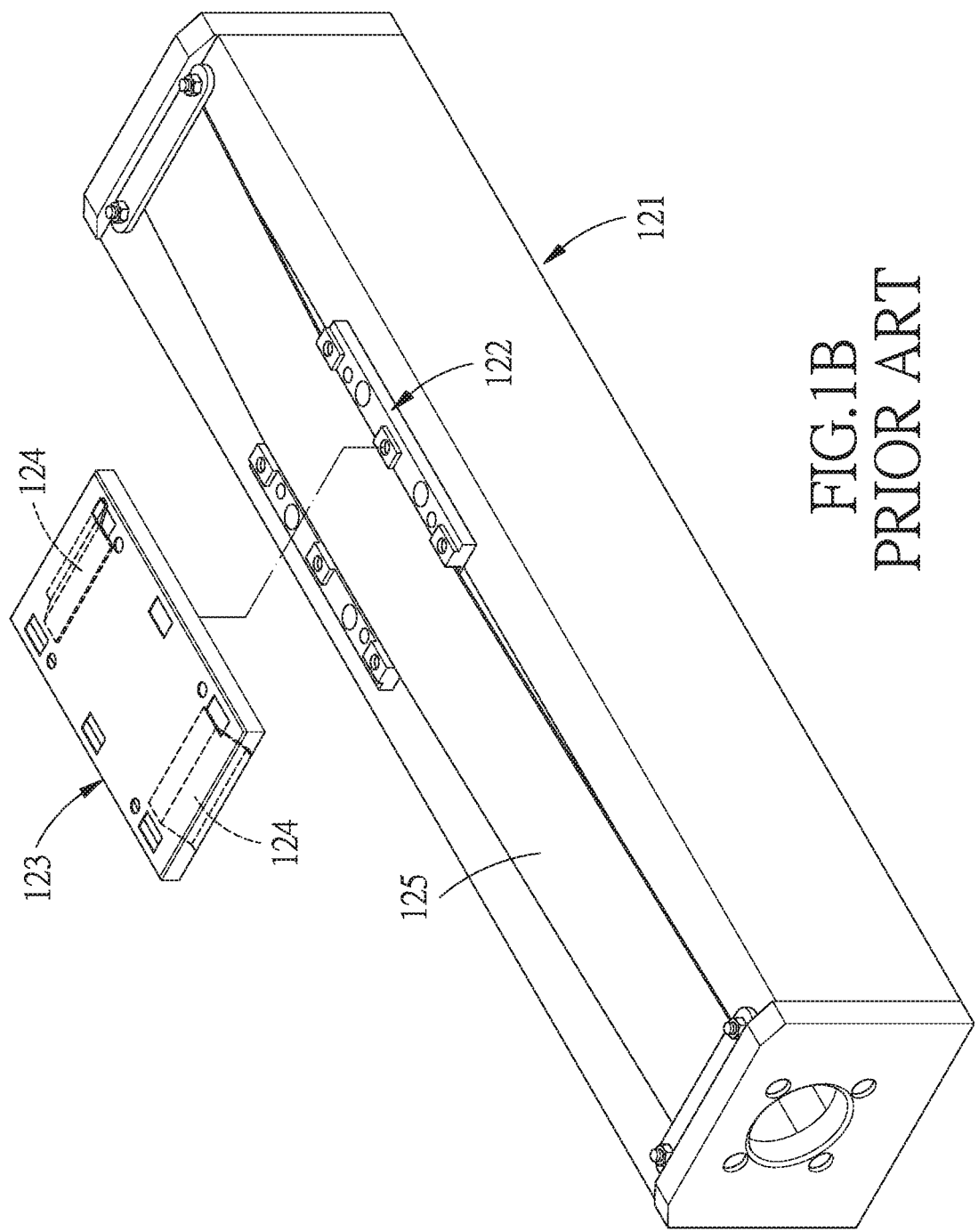
FIG. 1B is one of the drawings of the Taiwan Patent No. M319110.
Figure 1C:
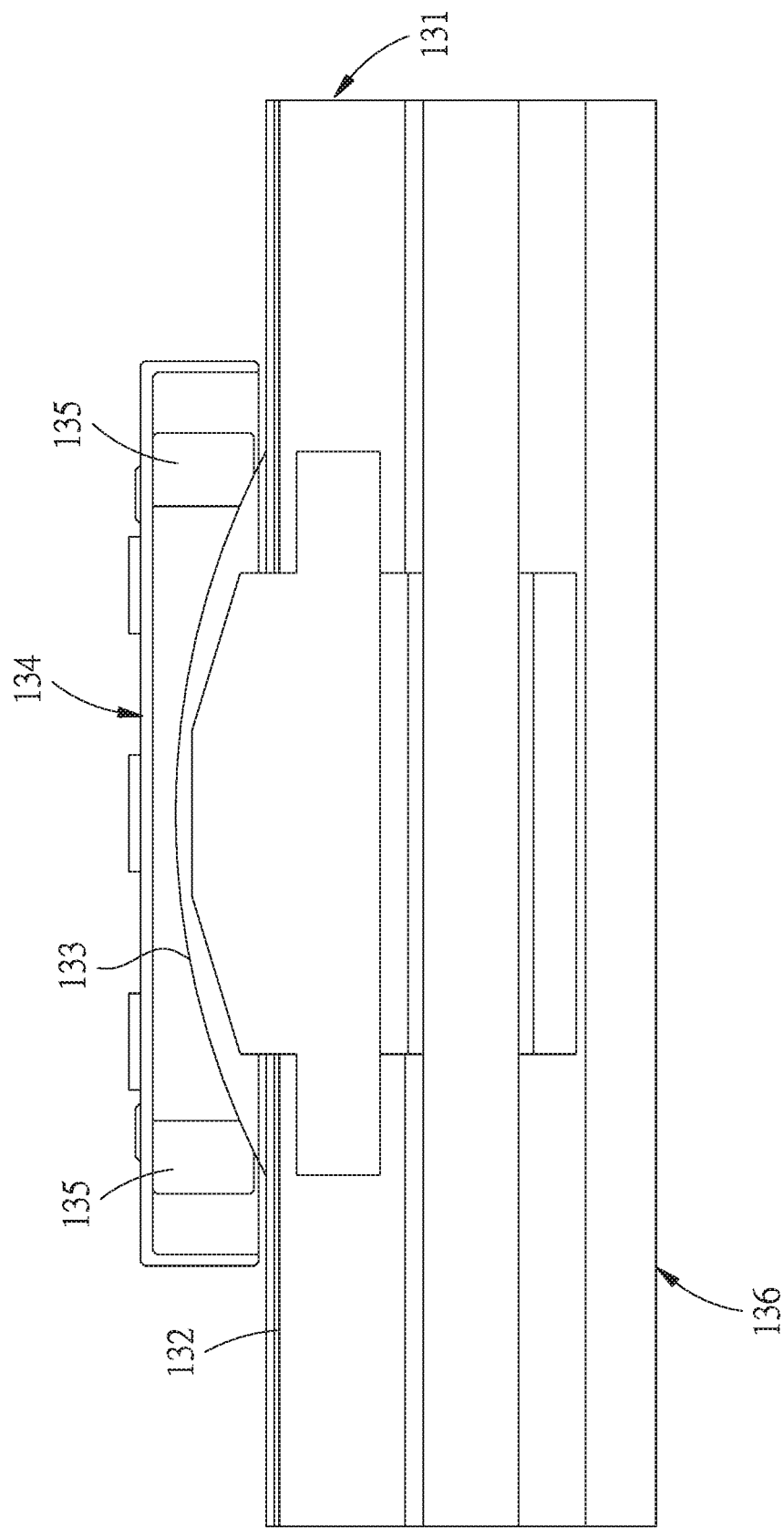
FIG. 1C is one of the drawings of the Japanese patent No. JP-A-2011-21745.
Figure 2:
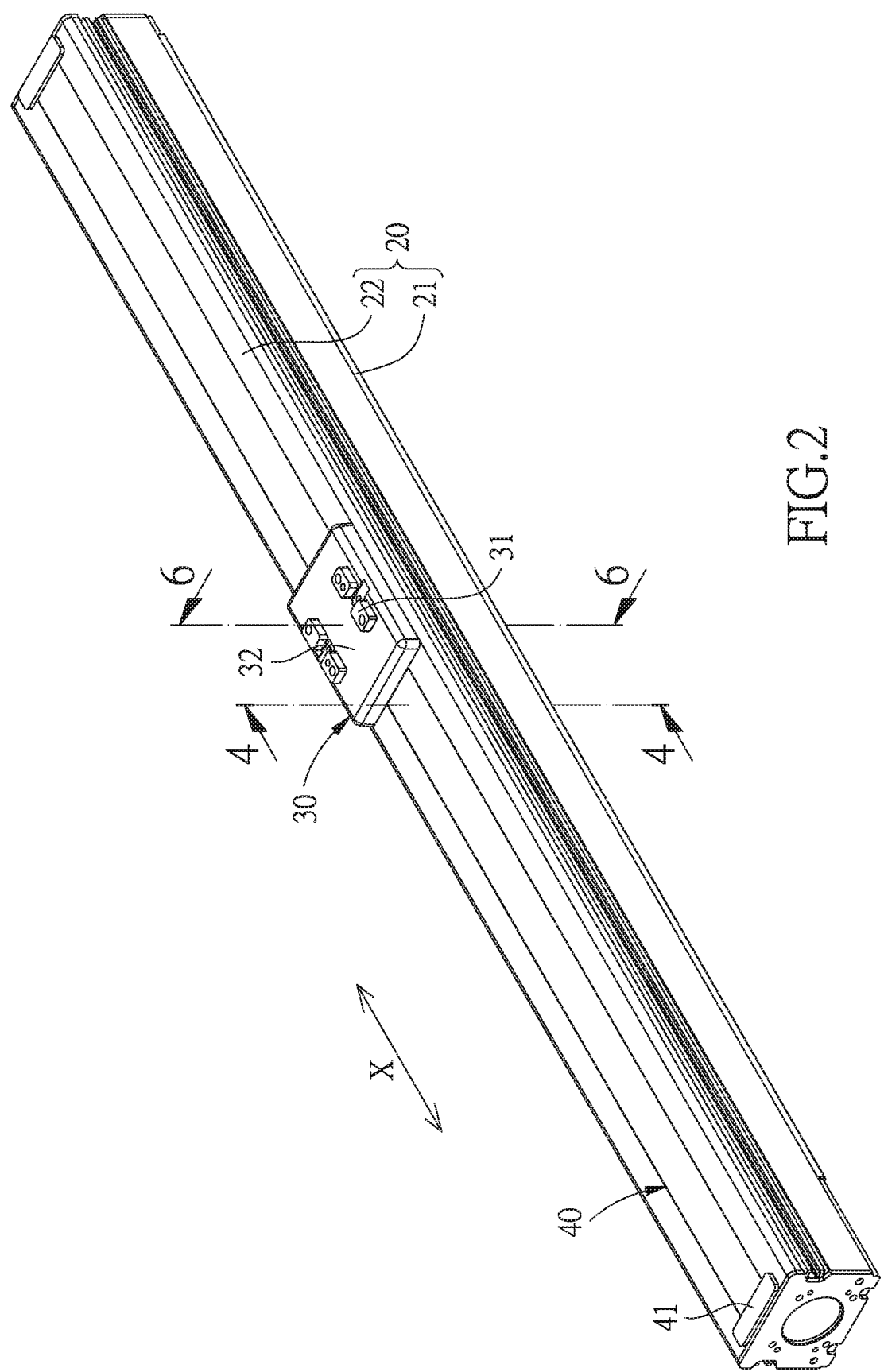
FIG. 2 is a perspective view of a low dust linear module in accordance with a preferred embodiment of the present invention.
Figure 3:
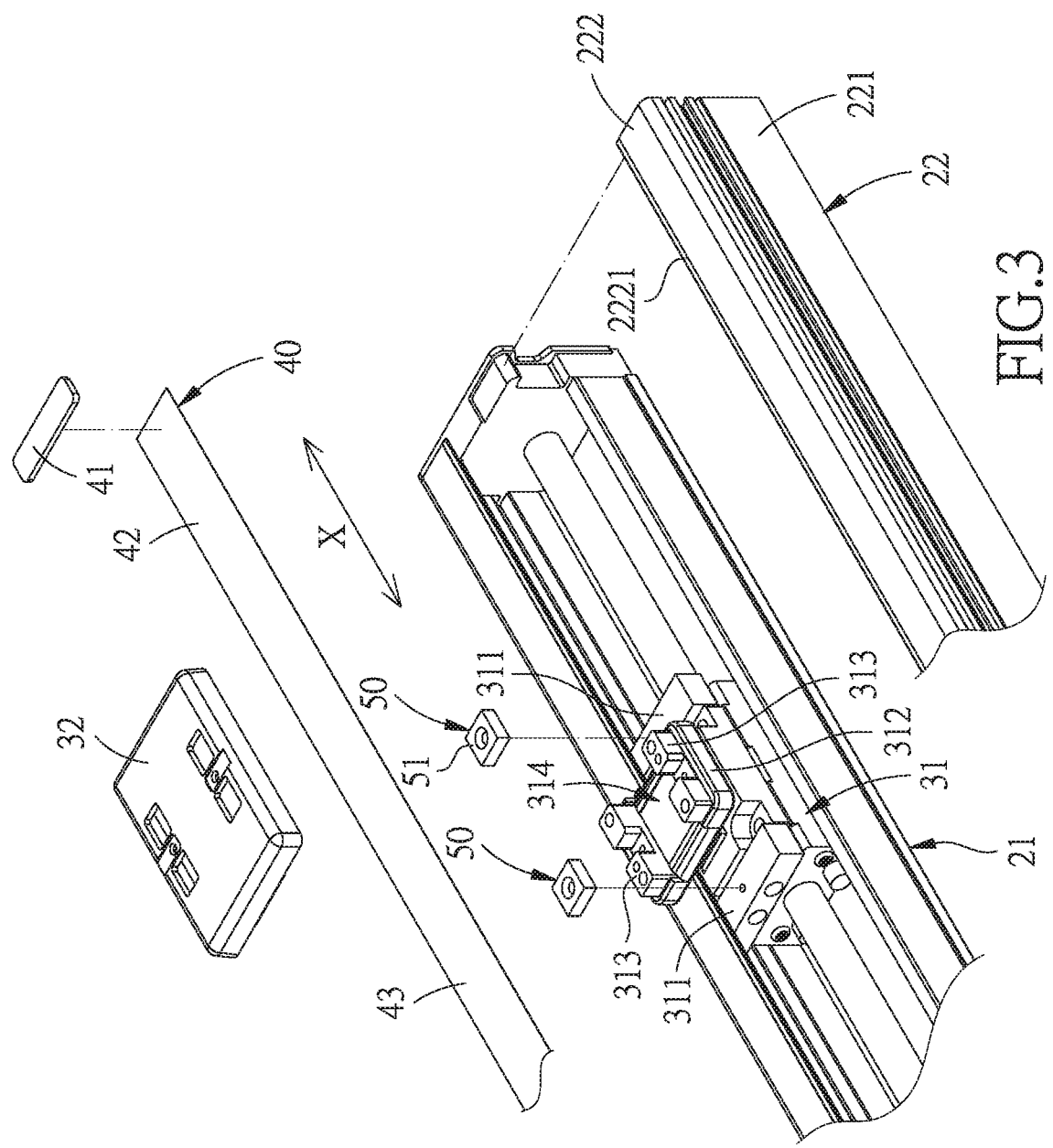
FIG. 3 is an exploded view of the low dust linear module in accordance with the preferred embodiment of the present invention.
Figure 4:
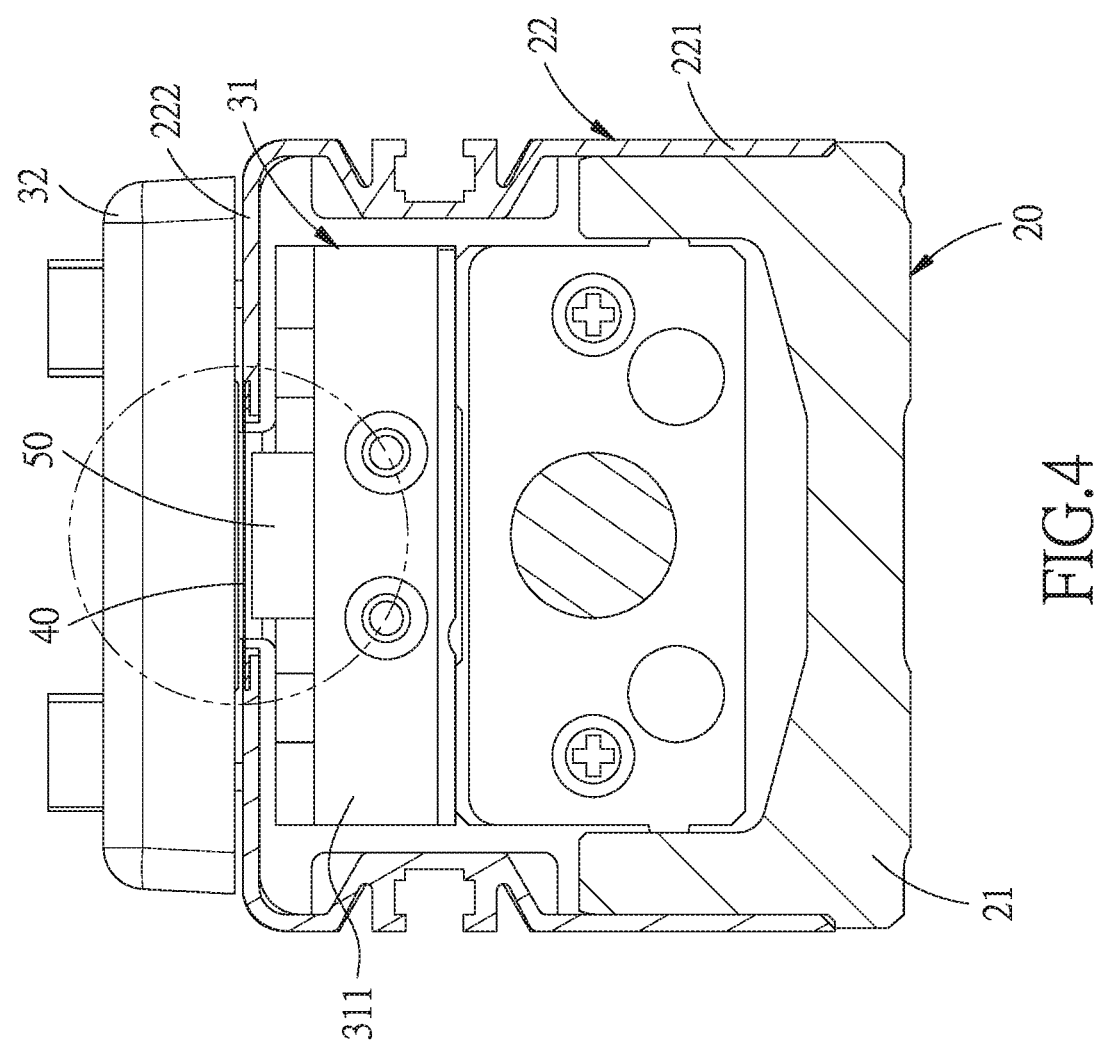
FIG. 4 is a cross sectional view taken along the line 4-4 of FIG. 3.
Figure 5:
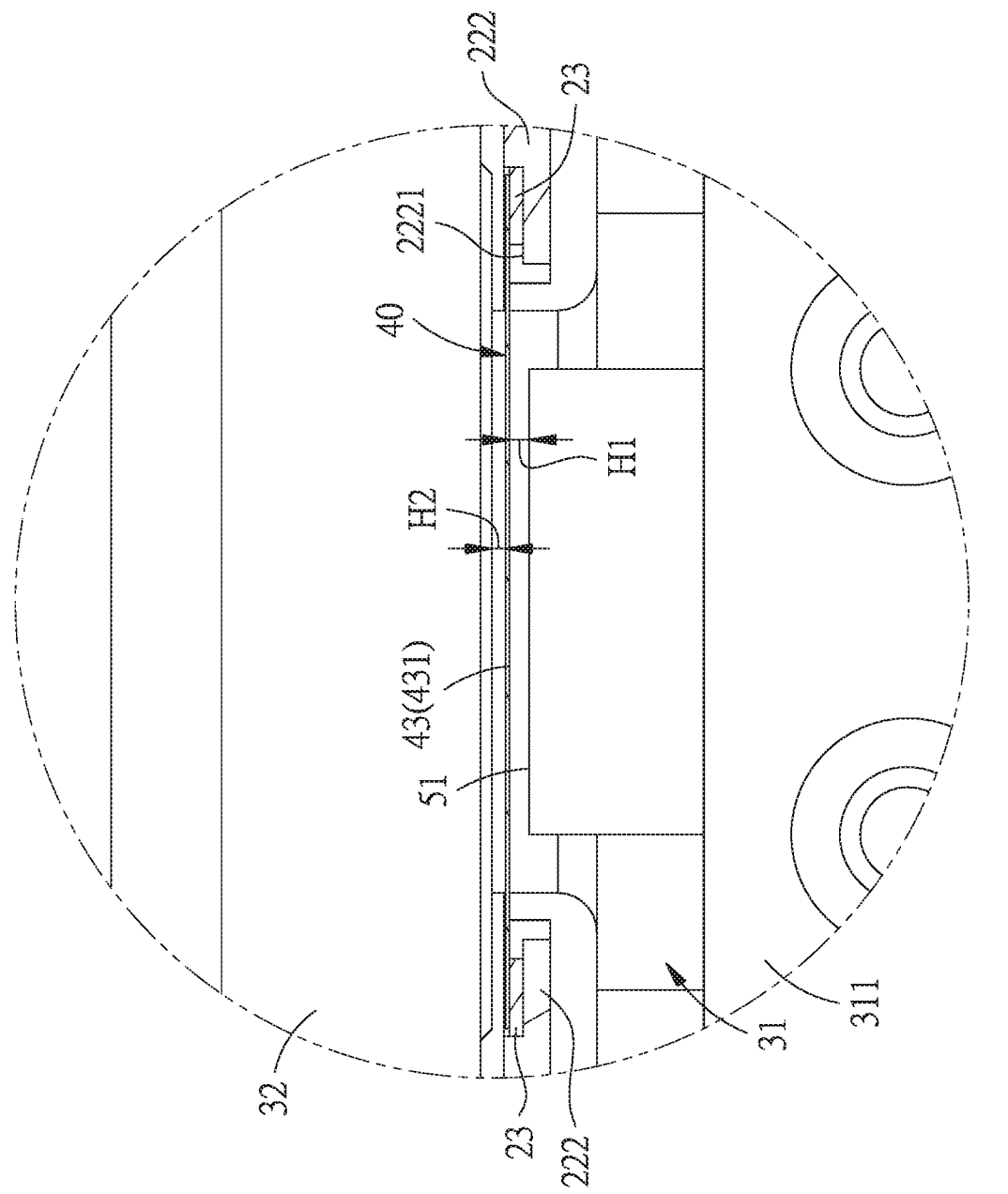
FIG. 5 is a magnified view of a part of FIG. 4.
Figure 6:
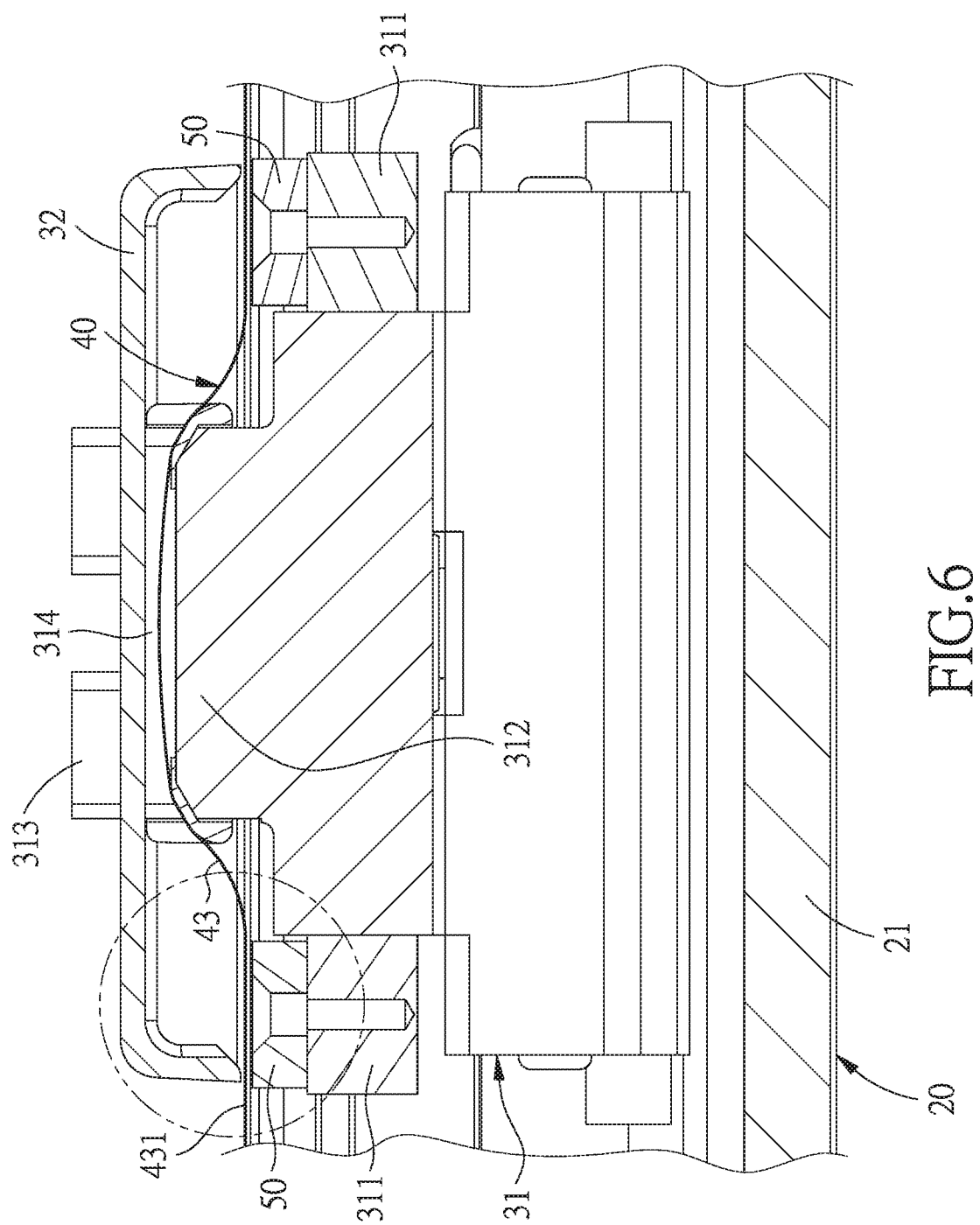
FIG. 6 is a cross sectional view of the low dust linear module in accordance with the preferred embodiment of the present invention.
Figure 7:
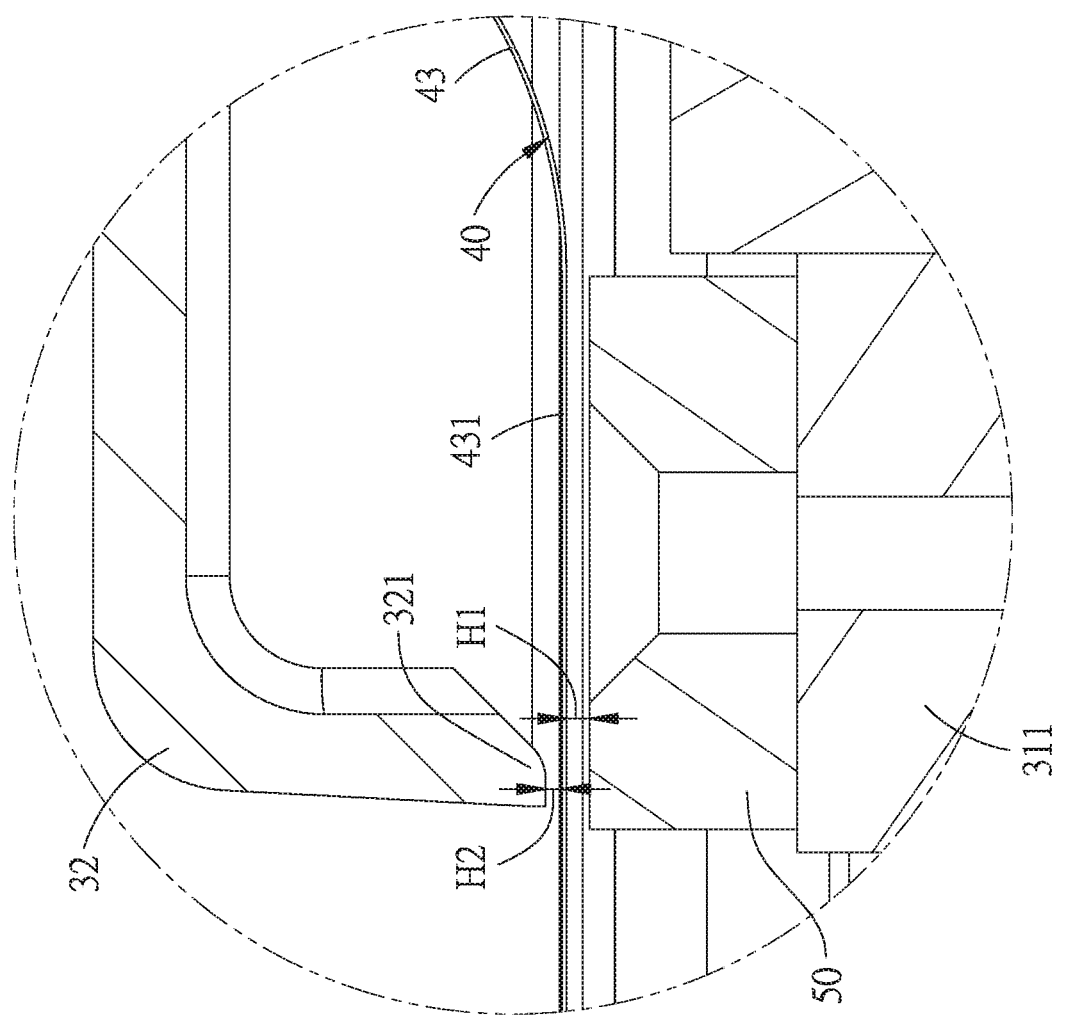
FIG. 7 is a magnified view of FIG. 6.

Referring to FIGS. 2-7, a low dust linear module in accordance with a preferred embodiment of the present invention comprises: a rail unit 20, a slide seat assembly 30, a dustproof strip 40, and two magnetic members 50.

The rail unit 20 includes a rail 21 and two side covers 22. The rail 21 includes a displacement direction X and two rail ends 211 disposed along the displacement direction X. The two side covers 22 are disposed at two sides of the rail 21, and each include a longitudinal portion 221 disposed at a lateral edge of the rail 21 and a transverse portion 222 connected to the longitudinal portion 221. A space 223 is defined between the two transverse portions 222, each of the transverse portions 222 is provided with a support groove 2221, and in each of the support grooves 2221 is disposed a magnetic strip 23.

The slide seat assembly 30 includes a slide seat 31 and a slide seat cover 32. The slide seat 31 is slidably disposed in the rail 21 along the displacement direction X, and has two slide seat end portions 311 disposed along the displacement direction X, an intermediate protrusion portion 312 disposed between the two slide seat end portions 311, and two slide seat side walls 313 formed on the two sides of the intermediate protrusion portion 312. A slide seat groove 314 is defined between the two slide seat side walls 313. The slide seat cover 32 is disposed on the slide seat 31 and includes two opposite slide-seat-cover ends 321 arranged along the displacement direction X, so that the two slide-seat-cover ends 321 correspond to the two slide seat end portions 311, respectively.

The dustproof strip 40 is made of a magnetic material, such as steel, and includes: two end portions 42 fixed to the two rail ends 211 by a pressing plate 41, and a magnetic attraction section 43 disposed between the two end portions 42 and inserted between the slide seat 31 and the slide seat cover 32. In this embodiment, the magnetic attraction section 43 of the dustproof strip 40 is inserted through the slide seat groove 314, and a part of the magnetic attraction section 43 of the dustproof strip 40 inserted in the intermediate protrusion portion 312 protrudes upward, and the rest part of the magnetic attraction section 43 that is not inserted in the intermediate protrusion portion 312 has two lateral edges magnetically attracted by the magnetic strips 23 disposed in the two support grooves 2221 of the side covers 22, namely, a first one of the magnetic strips 23 magnetically attracts one lateral edge of the magnetic attraction section 43, and a second one of the magnetic strips 23 magnetically attracts another lateral edge of the magnetic attraction section 43, so that the magnetic attraction section 43 of the dustproof strip 40 is sealed between the two side covers 22.

The two magnetic members 50 are disposed on a side of the slide seat 31 facing the dustproof strip 40. It is worth mentioning that the two magnetic members 50 are respectively disposed at the two slide seat end portions 311 of the slide seat 31 to magnetically attracts the magnetic attraction section 43 of the dustproof strip 40, and a top surface of each of the magnetic members 50 is lower than a top surface of the transverse portion 222 of each of the side covers 22. A portion of the magnetic attraction section 43 to be magnetically attracted by the magnetic members 50 is defined as a magnetic attraction area 431. A first magnetic attraction gap H1 is defined between the magnetic attraction area 431 and a corresponding one of the magnetic members 50, and a second magnetic attraction gap H2 is defined between the magnetic attraction area 431 and each of the two opposite slide-seat-cover ends 321 of the slide seat cover 32. In this embodiment, the material of each of the magnetic members 50 is neodymium magnet, but it is not limited thereto, and may be a neodymium iron boron magnet.

What mentioned above are the structural configurations of the present invention and their connection relations. Accordingly, the present invention can at least achieve the following effects:

Avoid the generation of dust or tiny particles due to friction. The two magnetic members 50 are respectively disposed at the two slide seat end portions 311 of the slide seat 31, the first magnetic attraction gap H1 is defined between the magnetic attraction area 431 and a corresponding one of the magnetic members 50, and the second magnetic attraction gap H2 is defined between the magnetic attraction area 431 and each of the two opposite slide-seat-cover ends 321 of the slide seat cover 32. When the dustproof strip 40 passes through and are magnetically attracted by the magnetic members 50, a gap will appear between the magnetic members 50 and the slide seat 31 and the slide seat cover 32, so that the magnetic members 50 and the dustproof strip 40 are kept in a gap without friction, so as to avoid the generation of dust or fine particles due to friction, so that the linear module can operate normally and maintain the standard of the working environment.

It should be noted that, in this embodiment, each of the magnetic members 50 has a rectangular shape, but is not limited thereto, and may be a circular shape, a circular arc shape, a half moon shape, or the like. In this embodiment, a magnetic surface 51 of each of the magnetic members 50 has a rectangular shape, and the length and width of the magnetic surface 51 are between 10 mm×10 mm and 12 mm×12 mm, the magnetic attraction force of each of the magnetic members 50 is between 2.3 and 5.6 kgf, and magnetic flux density Gauss (G) is between 3900 and 4100, whereby the first magnetic attraction gap H1 is between 0.1 and 0.8 mm, thereby ensuring that there are the first magnetic attraction gap H1 between the magnetic attraction area 431 and a corresponding one of the magnetic members 50, and the second magnetic attraction gap H2 between the magnetic attraction area 431 and the slide seat cover 32. In addition, when the magnetic surface of each of the magnetic members is circular, the diameter of the magnetic surface is between 10 mm and 18 mm, the thickness of each of the magnetic members is 3 mm to 5 mm, which also ensures that there are the first magnetic attraction gap H1 between the magnetic attraction area 431 and a corresponding one of the magnetic members 50, and the second magnetic attraction gap H2 between the magnetic attraction area 431 and the slide seat cover 32.

Secondly, the magnitudes of the first magnetic attraction gap H1 and the second magnetic attraction gap H2 are related to the size of the magnetic attraction area, the magnetic attraction force, and the magnetic flux density of the magnetic members 50, thereby being applicable to linear modules of various dimensions and ensuring that there are the first magnetic attraction gap H1 between the magnetic attraction area 431 and a corresponding one of the magnetic members 50, and the second magnetic gap H2 between the magnetic attraction area 431 and the slide seat cover 32.

While we have shown and described various embodiments in accordance with the present invention, it is clear to those skilled in the art that further embodiments may be made without departing from the scope of the present invention.

What is claimed is:

1. A low dust linear module comprising:
a rail unit having a displacement direction;
a slide seat assembly including a slide seat and a slide seat cover, wherein the slide seat is slidably disposed in the rail unit along the displacement direction, and has two slide seat end portions disposed along the displacement direction, the slide seat cover is disposed on the slide seat and includes two opposite slide-seat-cover ends arranged along the displacement direction; the low dust linear module is characterized in that:
a dustproof strip includes: two end portions fixed to the rail unit, and a magnetic attraction section disposed between the two end portions and inserted between the slide seat and the slide seat cover; and
at least one magnetic member is disposed on a side of the slide seat facing the dustproof strip, a portion of the magnetic attraction section to be magnetically attracted by the magnetic member is defined as a magnetic attraction area, a first magnetic attraction gap is defined between the magnetic attraction area and the magnetic member, and a second magnetic attraction gap is defined between the magnetic attraction area and one of the two opposite slide-seat-cover ends of the slide seat cover;
wherein a magnetic attraction force of the at least one magnetic member is between 2.3 and 5.6 kgf, a magnetic flux density Gauss is between 3900 and 4100, a magnetic surface of the at least one magnetic member has a rectangular shape, a length and a width of the magnetic surface are between 10 mm×10 mm and 12 mm×12 mm, and the first magnetic attraction gap is between 0.1 and 0.8 mm.

2. The low dust linear module as claimed in claim 1, wherein the rail unit includes a rail and two side covers, the two side covers are disposed at two sides of the rail, and each include a longitudinal portion disposed at a lateral edge of the rail and a transverse portion connected to the longitudinal portion, and a space is defined between the two transverse portions for receiving the dustproof strip.

3. The low dust linear module as claimed in claim 2, wherein each of the transverse portions is provided with a support groove, and a magnetic strip is disposed in each of the support grooves, a first one of the magnetic strips magnetically attracts one side of the magnetic attraction section of the dustproof strip, and a second one of the magnetic strips magnetically attracts another side of the magnetic attraction section of the dustproof strip.

4. The low dust linear module as claimed in claim 2, wherein a top surface of the at least one magnetic member is lower than a top surface of the transverse portion of each of the side covers.

5. The low dust linear module as claimed in claim 1, wherein the slide seat further includes an intermediate protrusion portion disposed between the two slide seat end portions, and two slide seat side walls formed on two sides of the intermediate protrusion portion, a slide seat groove is defined between the two slide seat side walls, the magnetic attraction section of the dustproof strip is inserted through the slide seat groove, and a part of the magnetic attraction section of the dustproof strip inserted in the intermediate protrusion portion protrudes upward.

6. The low dust linear module as claimed in claim 1, wherein there are two said magnetic members which are respectively disposed at the two slide seat end portions of the slide seat.

7. A low dust linear module comprising:
a rail unit having a displacement direction;
a slide seat assembly including a slide seat and a slide seat cover, wherein the slide seat is slidably disposed in the rail unit along the displacement direction, and has two slide seat end portions disposed along the displacement direction, the slide seat cover is disposed on the slide seat and includes two opposite slide-seat-cover ends arranged along the displacement direction; the low dust linear module is characterized in that:
a dustproof strip includes: two end portions fixed to the rail unit, and a magnetic attraction section disposed between the two end portions and inserted between the slide seat and the slide seat cover; and
at least one magnetic member is disposed on a side of the slide seat facing the dustproof strip, a portion of the magnetic attraction section to be magnetically attracted by the magnetic member is defined as a magnetic attraction area, a first magnetic attraction gap is defined between the magnetic attraction area and the magnetic member, and a second magnetic attraction gap is defined between the magnetic attraction area and one of the two opposite slide-seat-cover ends of the slide seat cover;
wherein a magnetic attraction force of the at least one magnetic member is between 2.3 and 5.6 kgf, a magnetic flux density Gauss is between 3900 and 4100, a magnetic surface of the at least one magnetic member has a circular shape, a diameter of the magnetic surface is between 10 mm and 18 mm, and a thickness of the at least one magnetic member is 3 mm to 5 mm.

8. The low dust linear module as claimed in claim 7, wherein the rail unit includes a rail and two side covers, the two side covers are disposed at two sides of the rail, and each include a longitudinal portion disposed at a lateral edge of the rail and a transverse portion connected to the longitudinal portion, and a space is defined between the two transverse portions for receiving the dustproof strip.

9. The low dust linear module as claimed in claim 8, wherein each of the transverse portions is provided with a support groove, and a magnetic strip is disposed in each of the support grooves, a first one of the magnetic strips magnetically attracts one side of the magnetic attraction section of the dustproof strip, and a second one of the magnetic strips magnetically attracts another side of the magnetic attraction section of the dustproof strip.

10. The low dust linear module as claimed in claim 8, wherein a top surface of the at least one magnetic member is lower than a top surface of the transverse portion of each of the side covers.

11. The low dust linear module as claimed in claim 7, wherein the slide seat further includes an intermediate protrusion portion disposed between the two slide seat end portions, and two slide seat side walls formed on two sides of the intermediate protrusion portion, a slide seat groove is defined between the two slide seat side walls, the magnetic attraction section of the dustproof strip is inserted through the slide seat groove, and a part of the magnetic attraction section of the dustproof strip inserted in the intermediate protrusion portion protrudes upward.

12. The low dust linear module as claimed in claim 7, wherein there are two said magnetic members which are respectively disposed at the two slide seat end portions of the slide seat.

* * * * *